(12) United States Patent
De Samber et al.

(10) Patent No.: US 12,336,504 B2
(45) Date of Patent: Jun. 24, 2025

(54) CONDITIONING DEVICE, A LIGHTING DEVICE AND A METHOD

(71) Applicant: SIGNIFY HOLDING B.V., Eindhoven (NL)

(72) Inventors: Marc Andre De Samber, Eindhoven (NL); Harry Broers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 254 days.

(21) Appl. No.: 17/632,608

(22) PCT Filed: Aug. 3, 2020

(86) PCT No.: PCT/EP2020/071821
§ 371 (c)(1),
(2) Date: Feb. 3, 2022

(87) PCT Pub. No.: WO2021/023715
PCT Pub. Date: Feb. 11, 2021

(65) Prior Publication Data
US 2022/0272944 A1    Sep. 1, 2022

(30) Foreign Application Priority Data
Aug. 6, 2019 (EP) ..................................... 19190182

(51) Int. Cl.
*A01K 15/02* (2006.01)
*A01K 29/00* (2006.01)
(52) U.S. Cl.
CPC ............ *A01K 15/02* (2013.01); *A01K 29/005* (2013.01)
(58) Field of Classification Search
CPC .... A01K 15/02; A01K 29/005; A01K 15/021; A01K 29/00; A01K 11/006; A01K 39/02; A01K 45/00; A01K 7/00; A01K 39/0213
(Continued)

(56) References Cited

U.S. PATENT DOCUMENTS 6,044,795 A * 4/2000 Matsuura ............. A01K 5/0275
                                                        119/51.02
8,578,884 B2 * 11/2013 Hawk ..................... A01K 39/02
                                                        362/253
(Continued)

FOREIGN PATENT DOCUMENTS

CN    102113877 A    7/2011
CN    108937885 A    12/2018
(Continued)

OTHER PUBLICATIONS

Apisit Kittawornrat, et al., "Toward a Better Understanding of Pig Behavior and Pig Welfare", Animal Health Research Reviews, Nov. 2010, pp. 1-8.
(Continued)

*Primary Examiner* — Peter M Poon
*Assistant Examiner* — Sahar Almatrahi

(57) ABSTRACT

The invention provides a conditioning device for conditioning at least one animal intended to experience a stressful event, such as e.g. slaughter, transport, and/or evacuation. The conditioning device comprises a controller configured to: obtain an identifier associated with the at least one animal; obtain an input indicative of a period of time in which said at least one animal receives a positive stimulus at a first location; control a lighting unit arranged for illuminating the first location to illuminate the at least one animal with a lighting characteristic at least partly during said period of time, and store an entry linking said identifier to said lighting characteristic in a memory. Complementary thereto, the invention further provides a lighting device for illuminating at least one animal intended to experience a stressful event, wherein the at least one animal is conditioned to a lighting characteristic with the conditioning device according to the invention, wherein the lighting device comprises: a light source; a communication interface
(Continued)

for communication with a memory; a detecting unit configured to determine the identifier of the at least one animal; a control unit configured to retrieve, with the communication interface, an entry linking said identifier to said lighting characteristic from said memory, and to control the light source to illuminate the at least one animal with said lighting characteristic during said stressful event.

19 Claims, 2 Drawing Sheets

(58) Field of Classification Search
USPC .......................................................... 119/712
See application file for complete search history.

(56) References Cited

U.S. PATENT DOCUMENTS

| | | | | |
|---|---|---|---|---|
| 10,182,964 | B2* | 1/2019 | Snow | A61H 23/00 |
| 10,295,135 | B2* | 5/2019 | Gammer | F21S 41/16 |
| 2011/0226185 | A1* | 9/2011 | Stadler | A01K 11/006 |
| | | | | 119/51.02 |
| 2012/0103276 | A1 | 5/2012 | Mainini | |
| 2014/0290583 | A1* | 10/2014 | Yin | A01K 5/0114 |
| | | | | 119/51.02 |
| 2015/0342143 | A1* | 12/2015 | Stewart | A01K 5/0283 |
| | | | | 119/51.02 |
| 2016/0323960 | A1* | 11/2016 | Grajcar | H05B 45/20 |
| 2018/0055434 | A1* | 3/2018 | Cheung | A61B 5/16 |
| 2018/0317454 | A1 | 11/2018 | Markham | |
| 2019/0125694 | A1 | 5/2019 | Juturu et al. | |
| 2019/0208739 | A1* | 7/2019 | Pozzi | A01K 29/005 |
| 2019/0215062 | A1* | 7/2019 | Engelen | H04W 4/08 |
| 2019/0281799 | A1* | 9/2019 | Sassmannshaus | A01K 67/033 |

FOREIGN PATENT DOCUMENTS

| | | |
|---|---|---|
| CN | 109716803 A | 5/2019 |
| JP | 2016042870 A | 4/2016 |
| WO | 2002086753 A1 | 10/2002 |
| WO | 2015129939 A1 | 9/2015 |
| WO | 2019117707 A1 | 6/2019 |

OTHER PUBLICATIONS

Sebastien Goumon, et al., "Influence of Loading Handling and Facilities on the Subsequent Response to Pre-Slaughter Stress in Pigs", Livestock Science 200, 2017, pp. 1-8.

Helen Clarke, "Defining the Behaviour of Different Pig Genotypes, The University of Leeds Institute of Integrative and Comparative Biology", Submitted Nov. 2008, pp. 1-100.

P.A. Philips, et al., "Preference Tests of Ramp Designs for Young Pigs", Can. J. Adim. Sci. 68: 41-48; Downloaded from www.nrcresearchpress.com, on May 7, 2019, pp. 41-48.

Temple Grandin, Department of Animal Sciences, Colorado State University, "Welfare of Pigs During Transport", Apr. 20, 2010, pp. 1-5.

* cited by examiner

CONDITIONING DEVICE, A LIGHTING DEVICE AND A METHOD

CROSS-REFERENCE TO PRIOR APPLICATIONS

This application is the U.S. National Phase application under 35 U.S.C. § 371 of International Application No. PCT/EP2020/071821, filed on Aug. 3, 2020, which claims the benefit of European Patent application Ser. No. 19/190,182.6, filed on Aug. 6, 2019. These applications are hereby incorporated by reference herein.

FIELD OF THE INVENTION

The invention relates to a conditioning device for conditioning at least one animal. The at least one animal is intended to experience a stressful event. The invention further relates to a lighting device for illuminating said at least one animal (conditioned with said conditioning device). The invention further relates to a kit of parts and/or a system comprising said conditioning device and said lighting device. The invention further relates to a method of conditioning and illuminating at least one animal intended to experience a stressful event; and a computer program product performing such a method.

BACKGROUND OF THE INVENTION

Animals may experience stressful events during their lifetime. For example, pets and/or hobby animals may experience a stressful event during transport or medical treatment. Another particular example applies to livestock animals. Livestock may also experience a stressful event during their lifecycle, for example during transport, evacuation, and/or slaughter. Such stressful events are known in the field of animal welfare.

For example: Evacuation may be characterized by driving said animals out from their stable, pen or waiting station to another location, such as e.g. a further processing station like e.g. slaughter, tagging, or milking. Different tools may thereby be used to induce movement and drive the animals forward, such as solid panels, flags and/or paddles. Evacuation may therefore be experienced as stressful by the animals. This is a clear disadvantage, particularly in view of animal welfare. Moreover, considering evacuation leading to slaughter, the experienced stressful events may also be disadvantageous for meat quality after processing.

It is therefore desired to reduce stress in animals intended to experience a stressful event, which leads to improved animal welfare and/or (in some examples) to better meat quality (due to the lower levels of cortisol and less pH changes in the flesh).

SUMMARY OF THE INVENTION

It is an object of the invention to provide an improved conditioning device for conditioning at least one animal intended to experience a stressful event, which at least alleviates the problems and disadvantages mentioned above. Thereto, the invention provides a conditioning device for conditioning at least one animal intended to experience a stressful event, wherein the conditioning device comprises a controller configured to: obtain an identifier associated with the at least one animal; obtain an input indicative of a period of time in which said at least one animal receives a positive stimulus at a first location; control a lighting unit arranged for illuminating the first location to illuminate the at least one animal with a lighting characteristic at least partly during said period of time, and store an entry linking said identifier to said lighting characteristic in a memory. Thereby, in an embodiment, the conditioning device may comprise the memory and/or the lighting unit. The conditioning device may therefore be phrased as a conditioning system comprising said memory and/or lighting unit.

Complementary thereto, the invention further provides a lighting device for illuminating at least one animal intended to experience a stressful event, wherein the at least one animal is conditioned to a lighting characteristic with the conditioning device according to the invention, wherein the lighting device comprises: a light source; a communication interface for communication with a memory; a detecting unit configured to determine the identifier of the at least one animal; a control unit configured to retrieve, with the communication interface, an entry linking said identifier to said lighting characteristic from said memory, and to control the light source to illuminate the at least one animal with said lighting characteristic during said stressful event. Thereby, said communication interface may communicate with the memory of the conditioning device and/or the memory to which the conditioning device stored said entry.

Hence, the present invention leverages and applies the principles of conditioning of animals, so as to condition the at least one animal with a lighting characteristic to said positive stimulus. The at least one animal may therefore associate the lighting characteristic to the positive stimulus (e.g. the reward). The conditioning device according to the invention is further configured to store said entry linking said identifier (of the at least one animal) to said lighting characteristic in a memory. Consequently, due to the at least one animal being conditioned to said lighting characteristic with a positive stimulus, and due to the fact that a positive stimulus may reduce stress in said at least one animal, the conditioning device advantageously makes said entry available in the memory; e.g. for reducing stress in said at least one animal when illuminated by a lighting device retrieving said entry. Another advantage is that the at least one animal may be conditioned unobtrusively.

Thereby, the lighting device according to the invention advantageously retrieves said entry linking said identifier of the at least one animal and the lighting characteristic, and is configured to illuminate the at least one animal upon determining the identifier of said at least one animal. As a result, the at least one animal is provided with illumination comprising a lighting characteristic to which the at least one animal is previously conditioned to experience a positive stimulus. Hence, the stress experienced by the at least one animal may advantageously be reduced before said stressful event. Therefore, the present invention provides devices for animal stress-relieve and animal welfare.

Said (intended to experience a) stressful activity may for example be one or more of: slaughter, transport, medical treatment and/or evacuation. Such activities are known stressful activities to animals and e.g. livestock. Slaughter may thereby be defined as the waiting period before processing the at least one animal and/or the processing period in which the at least one animal is slaughtered. Evacuation may be defined as any forced movement activity of the at least one animal between a first location and a second location. Transport may be defined similarly as evacuation, or the movement of said at least one animal within a confined space between a first location and a second location.

Said illuminating the at least one animal may be defined as directly illuminating at least a part of the at least one animal. Said illuminating the at least one animal may, additionally and/or alternatively, be defined illuminating an area visible to the at least one animal.

Moreover, in aspects, the control unit of the lighting device may be configured to: obtain an input indicative of a period of time in which the at least one animal experiences said stressful event, and to control the light source to illuminate the at least one animal with said lighting characteristic during said period of time.

In aspects, said input relating to the conditioning device or the lighting device may for example be respectively a schedule indicative of a period of time in which said at least one animal receives a positive stimulus at the first location, or the period of time in which said at least one animal experiences said stressful event. Moreover, in both cases, said period of time may comprise multiple subperiods of time. Hence, the period of time may be a repetitive periods of time in each of which respectively said at least one animal receives a positive stimulus at the first location, or said at least one animal experiences a stressful event. Namely, it may be common in farms to provide such stimuli on a repetitive basis, i.e. e.g. with a schedule (such as for example scheduled feeding); or provide such stressful events on a regular basis (such as e.g. fixed time for evacuation or processing). Conditioning the at least one animal during repetitive periods of time may be advantageous for improving the effectiveness of conditioning.

Hence, in examples, the controller may be configured to obtain an input indicative of a repetitive period of time in which said at least one animal receives a positive stimulus at a first location, and to control a lighting unit arranged for illuminating the first location to illuminate the at least one animal with a lighting characteristic at least partly during said repetitive period of time.

The at least one animal may for example be an animal suitable for consumption. The at least one animal may be a mammal. In an embodiment, the at least one animal may belong to the group of: pigs, chicken, birds, horse, and/or cattle. Alternatively, said at least one animal may belong to the group of: rodents and/or reptiles. Hence, the at least one animal may for example be at least one a pig, a suckling, a horse, a sheep, a bull, a cow, a chick, a mink, a rabbit, or a snake. Said at least one animal may be a single animal as mentioned above, but may also be a plurality of such animals. The at least one animal may for example be any group of animals, such as e.g. a flock of chicken, a herd of cows, or a group of horses.

The at least one animal may also be a leader animal of a group of animals. Some groups of animals tend to demonstrate social/group behavior, such as e.g. pigs. Hence, in aspects of the invention: Conditioning and illuminating the leader of such a group of animals according to the invention may cause said leader to experience reduced stress during said stressful event. Since the leader of the group of animals may be copied by the group of animals (due to said social/group behavior), the group of animals may follow the leader in behavior and reduce their respective stress level. Such copying behavior may for example be applicable to pigs. Hence, the conditioning device according to the invention may obtain an identifier associated with the leader of the group of animals, condition said leader according to the invention, and store an entry linking said identifier to said lighting characteristic in a memory according to the invention. The lighting device according to the invention may subsequently illuminate said leader of the group of animals during said stressful event, so as to also reduce the stress of the group of animals without having to detect and/or illuminate said group.

The at least one animal is at the first location when receiving said positive stimulus during a period of time. The first location may for example be a pen, a stable, a room, a space, an area, a processing station, a funnel, a cage, a container, etc.

Moreover, in an embodiment, said positive stimulus may comprise one or more of: feeding the at least one animal, watering the at least one animal, providing candy to the at least one animal, showering the at least one animal, and/or massaging the at least one animal. Such stimuli are proven well in the art to render the at least one animal with a positive experience and reduction of stress. Said positive stimulus may alternatively comprise providing a scent, such as a sex pheromone. Providing a plurality of said positive stimuli may also render a synergetic effect and thereby an enforced stimulus.

The at least one animal may need to be identified so as to be able to link an identifier of the at least one animal to the lighting characteristic to which the at least one animal is conditioned to. Hence, in an embodiment, the conditioning device comprises a detector for determining said identifier at the first location; wherein the controller may be configured to receive said identifier from the detector.

Furthermore, the detector may be one of: a radiofrequency receiver, a camera, a barcode scanner, a tag reader and/or an optical sensor. For example, the detector may be a radiofrequency receiver, such as a RFID antenna, which detects an RFID chip/tag associated with the at least one animal; the RFID chip/tag comprising an identifier associated with the at least one animal. Similarly, NFC tags may be used, or any other microchips for tagging an animal. Moreover, for example, the detector may be a camera for detecting a visual marker, such as e.g. an animal number marked on the at least one animal, which visual marker comprises an identifier (and/or coding) associated with the at least one animal. Similarly, the at least one animal may be associated with a barcode, which a barcode scanner may determine.

As mentioned, the lighting device according to the invention comprises a detecting unit. In an embodiment, said detecting unit may be one of: a radiofrequency receiver, a camera, a barcode scanner, a tag reader, an optical sensor, and/or a user input interface. Hence, such a detecting unit may be identical or similar in type to the detector of the conditioning device.

As mentioned, the conditioning device may comprise the lighting unit and/or the memory. The conditioning device may therefore be a single unit integrating the controller, memory and/or lighting unit in a single system. Alternatively, the conditioning device may be a system comprising the controller, memory and/or lighting unit, wherein at least two of said parts may be separate and wirelessly connected to each other (e.g. via a Bluetooth®, Wi-Fi®, or Zigbee® connection). The conditioning device may further comprise a communication interface for communicating with the lighting unit according to the invention.

In an embodiment, the memory may be a local memory, a remote memory, or a cloud server. The controller of the conditioning device may therefore store said entry in the local memory, the remote memory and/or the cloud server. The remote memory and cloud server may be in communication with the controller (and/or the local memory) by means of a wired connection, such as a LAN or internet connection, or a wireless connection via a wireless modality, such as Wi-Fi®, Bluetooth®, ZigBee®, RF, VLC, Li-Fi, etc.

In aspects, the memory may also be a local memory, and the controller may further be configured to copy the entry stored in said local memory to a separate and/or remote memory, such as a remote server, such as a cloud. Thus, the communication between the conditioning device and lighting device according to the invention may not be direct, but indirect via a cloud server. Hence, in such aspects, the invention may provide a conditioning device for conditioning at least one animal intended to experience a stressful event, wherein the conditioning device comprises a controller configured to: obtain an identifier associated with the at least one animal; obtain an input indicative of a period of time in which said at least one animal receives a positive stimulus at a first location; control a lighting unit arranged for illuminating the first location to illuminate the at least one animal with a lighting characteristic at least partly during said period of time, and store an entry linking said identifier to said lighting characteristic in a remote memory. The remote memory may be a cloud server. Complementary thereto, the invention may further provide a lighting device for illuminating at least one animal intended to experience a stressful event, wherein the at least one animal is conditioned to a lighting characteristic with the conditioning device according to the invention, wherein the lighting device comprises: a light source, a communication interface in communication with said remote memory according to the invention; a detecting unit configured to determine the identifier of the at least one animal; a control unit configured to retrieve, with the communication interface, the entry linking said identifier to said lighting characteristic from said remote memory, and to control the light source to illuminate the at least one animal with said lighting characteristic during said stressful event. The at least one animal may for example be intended for slaughter or transport.

In an embodiment, the conditioning device comprises: a receiver operatively coupled to the controller, wherein the receiver may be configured to receive said input from: an apparatus providing the positive stimulus to the at least one animal, or an apparatus for registering that a positive stimulus is being provided to the at least one animal. The former and/or the latter apparatus may for example be a feeding apparatus providing candy or fodder to the at least one animal. In an embodiment, the apparatus for registering that a positive stimulus is being provided to the at least one animal may be a user input device. Moreover, said conditioning device may also be integrated with such apparatuses. Hence, in an embodiment, the conditioning device comprises: the apparatus providing the positive stimulus to the at least one animal, or the apparatus for registering that a positive stimulus is being provided to the at least one animal.

As mentioned, the at least one animal is conditioned with a positive stimulus to the lighting characteristic. Thereby, in an embodiment, the lighting characteristic may comprise one or more of a color, an intensity, a modulation, a light scene, a spectral distribution, a color temperature. Such lighting characteristics are advantageous in conditioning an animal. Said light scene may for example comprise a pattern or an image, so as to add more selectiveness to the conditioning according to the invention.

Hence in embodiments, the lighting characteristic may comprise a first characteristic and a second characteristic, so as to provide a synergetic and more effective lighting characteristic for conditioning the at least one animal according to the invention, such as e.g. a color and a modulation.

In a further embodiment, the lighting characteristic comprises blue light having a peak wavelength between 380 to 500 nanometers. Such an embodiment may be advantageous for e.g. pigs, as the blue light is perceived better by pigs due to their improved vision in short wavelengths. The lighting characteristic may also be a light effect with such a blue light within a background with none or hardly any blue content.

Since the at least one animal is conditioned with a positive stimulus to the lighting characteristic, and since lighting characteristics may effectively be adapted, the conditioning device according to the invention may also provide an advantageous means to more effectively perform said conditioning according to the invention.

In examples, the controller may be arranged to select said lighting characteristic based on the identifier. This may be advantageous for providing a suitable and/or desired lighting characteristic for conditioning said at least one animal.

Moreover, said lighting unit and/or said lighting device may be a luminaire, a spotlight, a pixilated LED spot, a projector, and/or a wall washer.

It is a further object of the invention to provide an improved kit of parts. Thereto, the invention further provides a kit of parts comprising the conditioning device and the lighting device according to the invention. Thereby, advantages and/or embodiments applying to the conditioning device and/or lighting device according to the invention may mutatis mutandis apply to said kit of parts according to the invention.

It is a further object of the invention to provide an improved system. Thereto, the invention further provides a system comprising the conditioning device and the lighting device according to the invention. Thereby, advantages and/or embodiments applying to the conditioning device and/or lighting device according to the invention may mutatis mutandis apply to said system according to the invention.

The problem of stress during evacuation experienced by animals intended for slaughter is also present during transport of said animals. Hence, it is a further object of the invention to provide an improved vehicle for transporting at least one animal, which leverages the advantages of the conditioning device and the lighting device according to the invention. Thereto, the invention further provides a vehicle for transporting at least one animal, wherein the vehicle comprises the lighting device according to the invention. Said vehicle may be a lorry, a container, a container based transport vehicle, a truck, a car, an airplane, a boat, a ship, a moving belt, a train, and/or an autonomous vehicle.

For example, high-class racehorses are transported by means of airplane. Such an airplane may comprise the lighting device according to the invention to relieve stress of the racehorses, so as to improve their performance after said transport. This is a clear advantage and highly desired feature within such a scene.

It is a further object of the invention to provide an improved method of conditioning and illuminating at least one animal intended for slaughter. Thereto, the invention further provides a method of conditioning and illuminating at least one animal intended to experience a stressful event, wherein the method comprises: obtaining an identifier associated with the at least one animal; obtaining an input indicative of a period of time in which said at least one animal receives a positive stimulus at a first location; controlling a lighting unit arranged for illuminating the first location to illuminate the at least one animal with a lighting characteristic at least partly during said period of time, and storing an entry linking said identifier to said lighting characteristic in a memory;

wherein the method further comprises: determining the identifier of the at least one animal; retrieving the entry linking said identifier to said lighting characteristic from said memory; controlling a light source of a lighting device to illuminate the at least one animal with said lighting characteristic prior to the stressful event.

In an embodiment, the method may comprise obtaining an input indicative of a period of time in which the at least one animal experiences said stressful event, and to control ling the light source to illuminate the at least one animal with said lighting characteristic during said period of time.

The invention further relates to a computer program product. Hence, the invention provides a computer program product for a computing device, the computer program product comprising computer program code to perform the method(s) according to the invention when the computer program product is run on a processing unit of the computing device. Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

In aspects, the invention may further provide a lighting device for illuminating an area for guiding at least one animal, wherein the at least one animal is conditioned to a lighting characteristic with the conditioning device according to any one of the preceding claims, wherein the lighting device comprises: a light source; a communication interface for communication with a memory; a detecting unit configured to determine the identifier of the at least one animal; a control unit configured to retrieve, with the communication interface, an entry linking said identifier to said lighting characteristic from said memory, and to control the light source to illuminate the area for attracting the at least one animal with said lighting characteristic to said area, so as to guide the at least one animal. Hence, leveraging the conditioned animal, the present invention may also be advantageous in guiding the at least one animal to a particular area by attracting the at least one animal with a positive and/or stress relieving lighting characteristic.

In aspects, the invention provides: A lighting device for illuminating at least one animal comprising a detector and a processor, wherein the at least one animal is conditioned to a lighting characteristic by providing said lighting characteristic during a period of time in which the at least one animal received a positive stimulus; wherein the detector is configured to detect an identifier of the at least one animal, wherein the lighting device is configured to retrieve an entry linking said identifier to said lighting characteristic from a memory storing said entry, and illuminate the at least one animal with said lighting characteristic. Furthermore, the detector may be one of: a radiofrequency receiver, a camera, a barcode scanner, a tag reader and/or an optical sensor.

In further aspects, the invention provides an improved conditioning device for conditioning at least one animal intended to experience a stressful event, which at least alleviates the problems and disadvantages mentioned above. Thereto, in these further aspects, the invention provides a conditioning device for conditioning at least one animal intended to experience a stressful event, wherein the conditioning device comprises a controller configured to: obtain an identifier associated with the at least one animal; obtain an input indicative of a period of time in which said at least one animal receives a positive stimulus at a first location; obtain a lighting characteristic of a lighting unit illuminating the at least one animal at the first location at least partly during said period of time, and store an entry linking said identifier to said lighting characteristic in a memory. Thereby, in an embodiment, the conditioning device may comprise the memory and/or the lighting unit. The conditioning device may therefore be phrased as a conditioning system comprising said memory and/or lighting unit. Such an aspect according to the invention may be advantagous when e.g. during a day a changing light recipe is provided to the at least one animal, such that the conditioning device may obtain which lighting characteristic was present when the at least one animal received said positive stimulus and store said identifer with said lighting characteristic in said memory as the entry. The embodiments applying the conditioning device according to the first object of the invention may mutatis mutandis apply for the conditioning device according this further aspect of the invention.

BRIEF DESCRIPTION OF THE DRAWINGS

The invention will now be further elucidated by means of the schematic non-limiting drawings.

DETAILED DESCRIPTION

As partly mentioned before, animals intended to experience a stressful event may experience higher stress levels during said event. For example, such a stressful event may be evacuation, transport, medical treatment or the process of slaughter. Such higher stress levels are disadvantageous for the animal wellbeing and for example the quality of the meat after processing. It is therefore an objective to reduce stress in animals intended to experience a stressful event. Hence, the present invention leverages the principles of conditioning animals The present invention leverages and applies the principles of conditioning of animals, so as to condition at least one animal with a lighting characteristic to a positive stimulus. For the animal, receiving a particular lighting characteristic may therefore be associated to the positive stimulus to which it is conditioned to, thereby reducing stress levels when illuminated with said lighting characteristic. This very insight is embodied in devices, systems and methods according to the invention.

Figure 1:
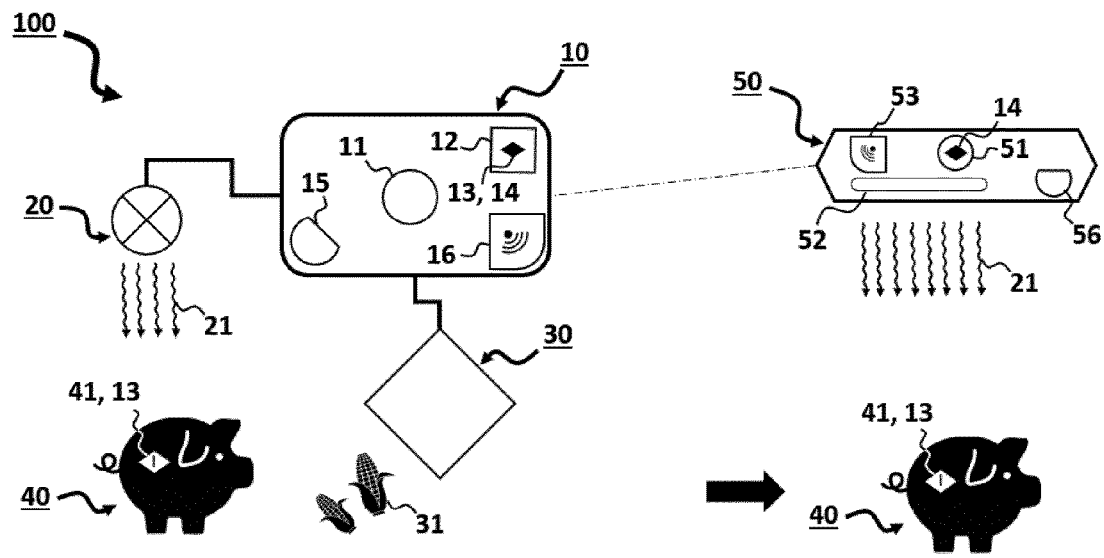
FIG. 1 depicts schematically an embodiment of a system according to the invention, wherein the system comprises a conditioning device and a lighting device.

FIG. 1 depicts, by non-limiting example, an embodiment of a system 100 comprising a conditioning device 10 and a lighting device 50. The system 100 further comprises a lighting unit 20 and an apparatus 30 for providing a positive stimulus to an animal. The conditioning device 10 is arranged for conditioning a pig 40 intended for slaughter. The pig 40 may alternatively be a plurality of pigs; or any other animal or plurality of animals from the group of cattle, birds, and/or chicken. The pig may alternatively be intended to experience a stressful activity, such as transport, medical treatment, or evacuation.

The conditioning device 10 comprises a controller 11 and a memory 12. The conditioning device further comprises a detector 15 and a wireless transceiver 16. The controller 11 is operatively coupled to said memory 12, detector 15 and wireless transceiver 16. The conditioning device 10 is moreover in connection and/or communication with the lighting unit 20, the apparatus 30 for providing a positive stimulus to an animal, and the lighting device 50 according to the invention. The conditioning device 10 is thereby in wired connection and/or communication with the lighting unit 20 and said apparatus 30, though alternatively said connection and/or communication may be wireless via e.g. and RF modality, Bluetooth®, ZigBee®, VLC, etc. The wireless transceiver 16 is arranged to allow further devices to communicate with the controller 11 and/or the memory 12, which may alternatively be a transceiver operating via a wired connection. Said transceiver may also be a communication interface.

Still referring to FIG. 1, the pig 40 is located at a first location. The lighting unit 20 is arranged to illuminate the first location. The apparatus 30 for providing a positive stimulus to an animal is also located at the first location. Here, the apparatus 30 for providing a positive stimulus to an animal is a fodder machine 30, namely for providing corn 31. The conditioning device 10 may in the present embodiment be at the first location but is not necessary to and may alternatively be at another location.

The pig 40 comprises a visual marker 41 with an identifier 13. Said identifier 13 is an identification number associated with the pig 40, but may alternatively be a barcode, color code or QR-code. The conditioning device 10 comprises the detector 15. Here, the detector 15 is a camera 15 configured to determine the visual marker 41 of the pig 40 at the first location, e.g. by means of image recognition and/or analysis (e.g. performed in association with the controller 11 and/or a local controller of the camera 15). Therefore, the camera 15 determines the visual marker 41 and identifies the corresponding identifier 13 of the pig 40. Alternatively: Said visual marker may be a data chip with wireless connectivity and/or a capability to be read out, such as an RFID tag, NFC chip, VLC tag, etc.; and said camera may be a detector for detecting respectively said different types of data chips accordingly. For example, said detector may alternatively be a radiofrequency receiver, RFID reader, NFC reader, tag reader, optical sensor, etc.

As partly indicated above, the fodder machine 30 is in wired connection and/or communication with the conditioning device 10. The fodder machine 30 provides the pig with corn 31. This may for example be a scheduled feed. Feeding is characterized to be a positive stimulus experienced by the pig 40. Alternative positive stimuli may for example be watering, massaging, providing candy, providing a desired scent such as a sex pheromone, and/or showering an animal. Such stimuli may be provided by corresponding machines. Hence, during the period of time in which the fodder machine 30 provides the pig 40 with corn 31, the pig 40 receives a positive stimulus at the first location. The fodder machine 30 is thereby also configured to register (an input) that the positive stimulus (i.e. providing fodder) is (currently) being provided to the pig 40. This input may also be a schedule comprising the time of providing the positive stimulus (i.e. providing fodder). The fodder machine 30 may thereby be configured to detect and identify the pig 40 by known means, e.g. also by a camera and visual recognition of the visual marker 41 of the pig 40. This information i.e. the period of time in which the pig 40 is being provided with a positive stimulus, is valuable input to the conditioning device 10 and may be forwarded to the conditioning device 10 or made available for the conditioning device 10 to retrieve. When the fodder machine 30 stops providing the corn 31, i.e. the positive stimulus, the fodder machine 30 may for example no longer indicate that the positive stimulus is being provided to the pig 40.

Still referring to FIG. 1, the controller 11 of the conditioning device 10 obtains the identifier 13 of the pig 40 from the camera 15, which detects and determines the visual marker 41 with said identifier 13. Similarly, the controller 11 of the conditioning device 10 obtains an input (not explicitly depicted) indicative of the period of time in which the pig 40 receives said positive stimulus at the first location from the fodder machine 30. The input is received via said wired connection between said conditioning device 10 and the fodder machine 30. Alternatively, when said connection is wireless, the conditioning device may comprise a receiver operatively coupled to the controller and configured to receive said input from the fodder machine. Thus, the conditioning device 10 obtains the identifier 13 of the pig 40 and the input indicating the period of time in which said pig 40 receives a positive stimulus at the first location.

Further, the conditioning device 10 is in wired connection and/or communication with the lighting unit 20. The lighting unit 20 may for example be a stable luminaire. The controller 11 of the conditioning device 10 controls the lighting unit 20 to illuminate the pig 40 with a lighting characteristic 21 during said period of time (indicated by the input). The controller 11 simultaneously stores an entry 14 in the memory 12, wherein the entry 14 links said identifier 13 of the pig 40 to said lighting characteristic 21.

Here, the lighting characteristic 21 is blue light having a peak wavelength of 400 nanometers. Such a spectral distribution is particularly suited for pigs, as pigs have more sensitivity in the short wavelength range (i.e. blue light). The lighting characteristic may alternatively be light with another spectral distribution, a color, a hue, an intensity, a modulation, a light scene, a light pattern, and/or a color temperature. Moreover, in examples, the lighting characteristic may thereby be selected by the controller 11 based on the identifier of the pig 40, so as to provide a suitable and/or desired lighting characteristic for conditioning said pig 40.

Still referring to FIG. 1, as a result of the conditioning of the pig 40, the memory 12 comprises the entry 14 linking said identifier 13 to the lighting characteristic 21. The pig 40 is at the first location, but will subsequently be evacuated to a second location. Here, the second location is a station prior to slaughter. The lighting device 50 according to the invention is at the second location. It is an object of the invention to reduce stress of the pig 40 at this second location.

Therefore, the lighting device 50 illuminates the pig 40 with the lighting characteristic 21 to which the pig 40 is conditioned to with the positive stimulus by means of the conditioning device 10, the fodder machine 30 and the lighting unit 20.

The lighting device 50 comprises a control unit 51, a light source 52 illuminating the second area, a detecting unit 56 and a communication unit 53 in the form of a transceiver 53. The transceiver 53 is in wireless communication with the conditioning device 10, and in particular arranged to retrieve data from the memory 12 of the conditioning device 10. Alternatively, said communication between the lighting device and the conditioning device may be wired, e.g. an internet connection. The detecting unit 56 is a camera, so as to determine the visual marker 41 of the pig 40 at the second location, e.g. by means of image recognition and/or analysis. Therefore, the detecting unit 56 determines the visual marker 41 and identifies the identifier 13 of the pig 40. Alternatively, the detecting unit may be a tag/chip reader for detecting tags/chips associated with the pig and conveying an identifier.

Upon identifying the pig 40, the control unit 51 retrieves, with the transceiver 53, the entry 14 linking said identifier 13 to said lighting characteristic 21 from the memory 12 of the conditioning device, by communicating to said conditioning device 10 via its respective transceiver 16. The memory 12 may for example be an accessible server in examples. Based on said entry 14 and said detected identifier 13, both now known by the lighting device 50, the control unit 51 controls the lighting device 50 to illuminate the pig 40 with said lighting characteristic (i.e. blue light having a peak wavelength of 400 nanometers). The illumination is thereby provided by the light source 52 of the lighting device 50.

As a result, the pig 40 is provided with illumination comprising a lighting characteristic to which the pig 40 is previously conditioned to experience a positive stimulus. Hence, the stress experienced by the pig during slaughter (i.e. the slaughter process) may advantageously be reduced.

In an embodiment, not depicted, the embodiment depicted in FIG. 1 is provided, but in that the conditioning device comprises the lighting unit 20 as well. In such an embodiment, the conditioning device may for example be a connected luminaire.

Figure 2:
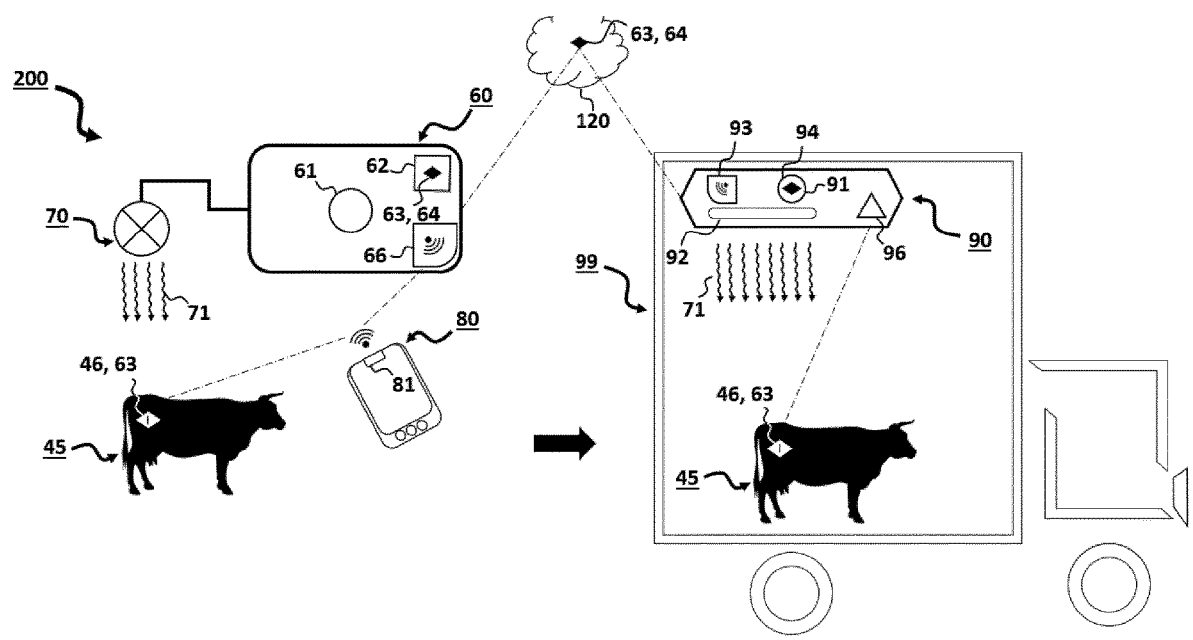
FIG. 2 depicts schematically another embodiment of a system according to the invention, wherein the system comprises a conditioning device and a lighting device.

FIG. 2 depicts, by non-limiting example, an embodiment of a system 200 comprising a conditioning device 60 and a vehicle 99 comprising a lighting device 90. The vehicle 99 is arranged for transporting cattle. The system 200 further comprises a lighting unit 70 and a user input device 80 for registering that a positive stimulus is provided to an animal. The conditioning device 60 is arranged for conditioning a cow 45 intended for transport. The cow 45 may alternatively be a plurality of cows or a group of cattle.

The conditioning device 60 comprises a controller 61 and a local memory 62 associated therewith. The conditioning device 60 further comprises a wireless transceiver 66. The controller 61 is operatively coupled to said local memory 62 and wireless transceiver 66. The conditioning device 60 is moreover in connection and/or communication with the lighting unit 70, the user input device 80, and a cloud server 120. The conditioning device 60 is thereby in wired connection and/or communication with the lighting unit 70; and in wireless connection with said user input device 80 and cloud server 120 via the transceiver 66. The wireless transceiver 66 is arranged to allow further devices to communicate with the controller 61 and/or the local memory 62, which may alternatively be a transceiver operating via a wired connection. Said wireless connection may for example be Wi-Fi®, ZigBee®, Bluetooth®, Lo-Ra, VLC, GSM, RF and/or Li-Fi. Hence, in alternative embodiments, since the local memory is not necessary, the controller may also directly store said entry in the cloud server.

The cow 45 is located at a first location. The first location may be a stable. The lighting unit 70 is arranged to illuminate the first location. The cow 45 receives a positive stimulus at the first location. The positive stimulus is showering the cow 45. Showering is characterized to be a positive stimulus experienced by the cow 45. Alternative positive stimuli may for example be feeding, massaging, providing candy, providing a desired scent such as a sex pheromone, and/or showering an animal. Such stimuli may be provided by corresponding machines and/or personnel. The cow 45 comprises an NFC tag 46 encoded with an identifier 63. The identifier 63 is associated with the cow 45.

The user input device 80 registers (as an input) the period of time that the cow 45 is being provided with the positive stimulus (i.e. the showering). The user input device 80 further (as an input) detects the RFID tag 46 of the cow 45, with an RFID reader 81, and determines said identifier 63 associated with the cow 45. The user input device 80 further (as an input) registers the location of the cow 45 being the first location. This may for example be done by a user input, or the user input device determining said first location via positioning means, such as GPS, VLC, Bluetooth®, etc. In alternative embodiments, such location may for example be obtained by the user input device via a location identifier encoded in the light (via VLC) emitted by the lighting unit. Consequently, the user input device 80 forwards to the conditioning device 60 an input comprising the period of time in which the cow 45 is being provided with the positive stimulus, the identifier 63 of the cow 45, and the registered/obtained first location.

Still referring to FIG. 2, the conditioning device 60 receives said input via the wireless transceiver 66. Alternatively, the input may be forwarded to a cloud (such as cloud server 120) or a remote server or remote device, from which the conditioning device retrieves said input. Thus, the conditioning device 60 obtains the identifier 63 of the cow 45 and the period of time in which said cow 45 receives a positive stimulus at the first location.

As the conditioning device 60 is in wired connection and/or communication with the lighting unit 70, the controller 61 of the conditioning device 60 controls the lighting unit 70 to illuminate the cow 45 with a lighting characteristic 71 during said period of time (indicated by the input). Alternatively, said lighting unit may be a wirelessly connected lighting unit, and the communication may be wireless. The controller 61 simultaneously stores an entry 64 in the local memory 62, wherein the entry 64 links said identifier 63 of the cow 45 to said lighting characteristic 71. Moreover, the controller 61 forwards the entry 64 to a remote cloud server 120 with the wireless transceiver 66. The cloud server 120 is arranged to store said entry 64, and similar entries with other animals in the stable. The lighting characteristic 71 is a lighting scene comprising a modulated intensity of green light. Alternatively, other suitable lighting characteristics for conditioning may be envisioned.

Still referring to FIG. 2, as a result of the conditioning of the cow 45, the cloud server 120 now comprises the entry 64 linking said identifier 63 to the lighting characteristic 71. The cow 45 is at the first location, but will subsequently be evacuated to a further location with the vehicle 99. Transport is a stressful activity for the cow 45. The cargo space of the vehicle 99 is the second location. The cow 45 is transported within this cargo space to said further location. The lighting device 90 according to the invention is mounted in said cargo space of the vehicle 99, hence at this second location, and illuminates the cargo space of the vehicle 99. It is an object of the invention to reduce stress of the cow 45 at this second location, namely during transport.

Therefore, the lighting device 90 illuminates the cow 45 with the lighting characteristic 71 to which the cow 45 is conditioned to with the positive stimulus by means of the conditioning device 60 and the corresponding lighting unit 70.

The lighting device 90 comprises a control unit 91, a light source 92 illuminating the second location (i.e. cargo space of the vehicle 99), a detecting unit 96 and a transceiver 93. The transceiver 93 is in wireless communication with the cloud server 120. The detecting unit 96 is an RFID reader, so as to determine the RFID tag 46 of the cow 45 at the second location, and thereby to obtain the identifier 63 of the cow 45.

Upon identifying the cow 45, the control unit 91 retrieves, with the transceiver 93, the entry 64,94 linking said identifier 63 to said lighting characteristic 71 from the cloud server 120. Based on said entry 64,94 and said detected identifier 63 (both now known by the lighting device 90) the control unit 91 controls the lighting device 90 to illuminate the cow 45 with said lighting characteristic (i.e. a lighting scene comprising a modulated intensity of green light). The illumination is thereby provided by the light source 92 of the lighting device 90.

As a result, the cow 45 is provided with illumination comprising a lighting characteristic to which the cow 45 is previously conditioned to experience a positive stimulus. Hence, the stress experienced by the cow during transport with the vehicle 99 may advantageously be reduced.

Figure 3:
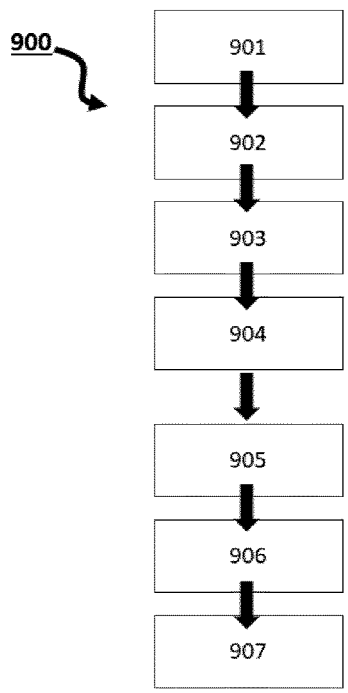
FIG. 3 depicts schematically a method according to the invention.

FIG. 3 depicts, by non-limiting example, a method 900 of conditioning and illuminating at least one animal intended to experience a stressful event. Said at least one animal is a flock of chicken. The stressful event is evacuating the chicken out of a stable. The method 900 first comprises the step 901 of obtaining an identifier associated with the flock of chicken. The identifier may for example be stored in a data tag carried by some of the chickens of the flock, so as to identify the flock. The identifier may be read out with a tag reader. The method 900 further comprises the step 902 of obtaining an input indicative of a period of time in which said flock of chicken receives a positive stimulus at a first location. Here, the positive stimulus is feeding. The input is provided by a machine identifying and feeding the chicken. Subsequently, the method 900 comprises the step 903 of controlling a lighting unit arranged for illuminating the flock of chicken with a lighting characteristic at least partly during said period of time (i.e. of feeding). The lighting characteristic may therefore be associated to the positive stimulus, thereby conditioning the chicken to the positive stimulus with said lighting characteristic. Here, the lighting characteristic is illumination with a peak intensity in the ultraviolet range. Other alternative lighting characteristics may also be envisioned. Further, the method 900 comprises the step 904 of storing an entry linking said identifier to said lighting characteristic in a memory. The memory is here a remote memory, but may alternatively be a local memory comprised by the conditioning device. The flock of chicken may then be evacuated to a second location. The method 900 continues with the step 905 of determining the identifier of the flock of chicken, and the step 906 of retrieving the entry linking said identifier to said lighting characteristic from said memory. Finally, the method 900 comprises the step 907 of controlling a light source of the lighting device to illuminate the flock of chicken with said lighting characteristic.

Figure 4:
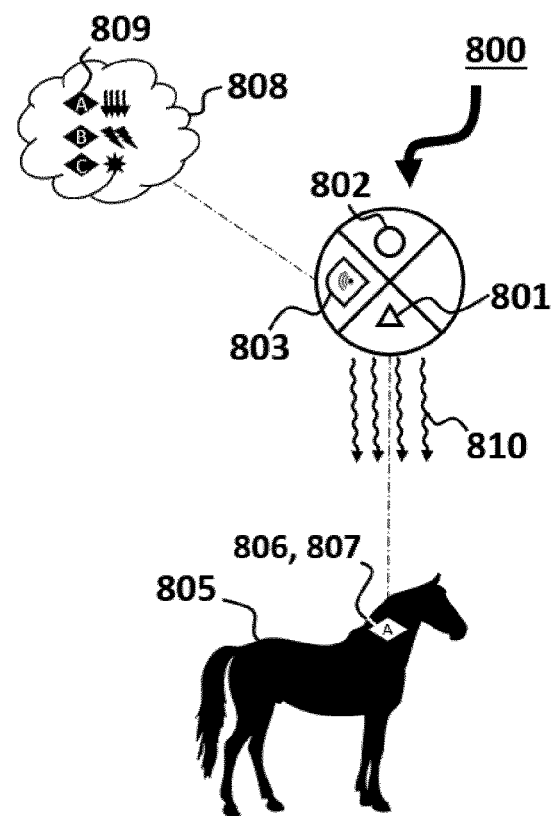
FIG. 4 depicts schematically a lighting device according to the invention.

FIG. 4 depicts, by non-limiting example, an embodiment of a lighting device 800 according to the invention. The lighting device 800 comprises a detector 801 and a processor 802. The lighting device 800 further comprises a communication interface 803.

The horse 805 carries a data tag 806 comprising an identifier 807 associated with the horse 805. The horse 805 is conditioned to a lighting characteristic 810 by providing said lighting characteristic 810 during a period of time in which the horse 805 received a positive stimulus. The positive stimulus is massaging the horse 805, and the lighting characteristic 810 is a blue hue, since the limited color vision of horses is particularly sensitive to the color blue. Said period of time is thereby a repetitive period of time, such that each period of time of the repetitive period of time the horse 805 is massaged, the lighting device provides the lighting characteristic and thereby conditions the horse 805 according to the invention. Data on said conditioning is stored in a remote server 808. Namely, the remote server 808 comprises an entry 809 linking an identifier of the horse 805 to said lighting characteristic. Entries associated with other horses may also be stored.

The detector 801 detects the horse 805 within the illumination area of the lighting device 800, and the detector 801 thereby detects the data tag 806 comprising the identifier 807 associated with the horse 805. The processor 802 obtains said identifier 807. Based on said identifier 807, the lighting device 800 (by means of the processor 802 and said communication interface 803) retrieves the entry 809 linking said identifier 807 to said lighting characteristic 810 from the remote server 808 storing said entry 809. The communication interface 803 operates via a wireless Wi-Fi connection, but may alternatively be any other wireless modality, or a wired connection such as an internet connection. Subsequently, the lighting device 800 illuminates (with a light source (not explicitly depicted)) the horse 805 with said lighting characteristic 810.

As a result, the horse 805 is provided with illumination comprising a lighting characteristic 810 to which the horse 805 is previously conditioned to experience a positive stimulus. Hence, stress experienced by the horse, e.g. during transport, may advantageously be reduced.

In an embodiment, not depicted, the embodiment depicted in FIG. 4 is provided, but in that the lighting device illuminates a pet animal intended to experience a stressful event, wherein the stressful event is medical treatment at a veterinary practice. Such embodiments may be advantageous to animal well being in their medical treatment, because stress levels are reduced during stressful events associated with the pet animal in the veterinary practice.

The invention claimed is:

1. A conditioning device for conditioning at least one animal intended to experience a stressful event, wherein the conditioning device comprises a controller configured to:
   obtain an identifier associated with the at least one animal;
   obtain an input indicative of a period of time in which said at least one animal receives a positive stimulus at a first location;
   control a lighting unit arranged for illuminating the first location to illuminate the at least one animal with a lighting characteristic at least partly during said period of time, and
   store an entry linking said identifier to said lighting characteristic in a memory;
   wherein the conditioning device comprises a receiver operatively coupled to the controller, wherein the receiver is configured to receive said input from:
   an apparatus providing the positive stimulus to the at least one animal, or
   an apparatus for registering that a positive stimulus is being provided to the at least one animal.

2. The conditioning device according to claim 1, wherein the conditioning device comprises a detector for determining said identifier at the first location;
   wherein the controller is configured to receive said identifier from the detector.

3. The conditioning device according to claim 2, wherein the detector is one of: a radiofrequency receiver, a camera, a barcode scanner, a tag reader and/or an optical sensor.

4. The conditioning device according to claim 1, wherein the conditioning device comprises the memory and/or the lighting unit.

5. The conditioning device according to claim 1, wherein the apparatus for registering that a positive stimulus is being provided to the at least one animal is a user input device.

6. The conditioning device according to claim 1, wherein the lighting characteristic comprises one or more of a color, an intensity, a modulation, a light scene, a spectral distribution, a color temperature.

7. The conditioning device according to claim 1, wherein the lighting characteristic comprises blue light having a peak wavelength between 380 to 500 nanometers.

8. The conditioning device according to claim 1, wherein the at least one animal belongs to the group of: pigs, chicken, birds, horse and/or cattle.

9. The conditioning device according to claim 1, wherein the positive stimulus comprises one or more of:
feeding the at least one animal,
watering the at least one animal,
providing candy to the at least one animal,
showering the at least one animal, and/or
massaging the at least one animal.

10. A lighting device for illuminating at least one animal intended to experience a stressful event, wherein the at least one animal is conditioned to a lighting characteristic with the conditioning device according to claim 1, wherein the lighting device comprises:
a light source;
a communication interface for communication with a memory;
a detecting unit configured to determine the identifier of the at least one animal; and
a control unit configured to retrieve, with the communication interface, an entry linking said identifier to said lighting characteristic from said memory, and to control the light source to illuminate the at least one animal with said lighting characteristic during said stressful event.

11. The lighting device according to claim 10, wherein the detecting unit is one of: a radiofrequency receiver, a camera, a barcode scanner, a tag reader, an optical sensor, and/or a user input interface.

12. A kit of parts comprising the conditioning device according to claim 1.

13. A vehicle for transporting at least one animal, wherein the vehicle comprises the lighting device according to claim 10.

14. A method of conditioning and illuminating at least one animal intended to experience a stressful event, wherein the method comprises:
obtaining an identifier associated with the at least one animal;
receive an input indicative of a period of time in which said at least one animal receives a positive stimulus at a first location, from an apparatus providing the positive stimulus to the at least one animal, or an apparatus for registering that a positive stimulus is being provided to the at least one animal;
controlling a lighting unit arranged for illuminating the first location to illuminate the at least one animal with a lighting characteristic at least partly during said period of time, and
storing an entry linking said identifier to said lighting characteristic in a memory;
wherein the method further comprises:
determining the identifier of the at least one animal;
retrieving the entry linking said identifier to said lighting characteristic from said memory; and
controlling a light source of a lighting device to illuminate the at least one animal with said lighting characteristic prior to the stressful event.

15. A system comprising:
a conditioning device for conditioning at least one animal intended to experience a stressful event, wherein the conditioning device comprises a controller configured to:
obtain an identifier associated with the at least one animal;
obtain an input indicative of a period of time in which said at least one animal receives a positive stimulus at a first location;
control a lighting unit arranged for illuminating the first location to illuminate the at least one animal with a lighting characteristic at least partly during said period of time, and
store an entry linking said identifier to said lighting characteristic in a memory; and
a lighting device for illuminating the at least one animal, the lighting device remote from the conditioning device and comprising:
a light source;
a communication interface for communication with the memory;
a detecting unit configured to determine the identifier of the at least one animal; and
a control unit configured to retrieve, with the communication interface, the entry linking said identifier to said lighting characteristic from said memory, and to control the light source to illuminate the at least one animal with said lighting characteristic during said stressful event.

16. The system of claim 15 wherein the conditioning device comprises a receiver operatively coupled to the controller.

17. The system of claim 16 wherein the receiver is configured to receive said input from an apparatus providing the positive stimulus to the at least one animal.

18. The system of claim 16 wherein the receiver is configured to receive said input from an apparatus for registering that a positive stimulus is being provided to the at least one animal.

19. The system of claim 15 wherein the memory is a remote memory or a cloud server.

\* \* \* \* \*